(12) United States Patent
Vandervalk et al.

(10) Patent No.: US 8,914,566 B2
(45) Date of Patent: Dec. 16, 2014

(54) MANAGING INTERRUPTS

(75) Inventors: David Vandervalk, Chelmsford, MA (US); Lloyd K. Frick, Pepperell, MA (US)

(73) Assignee: Teradyne, Inc., North Reading, MA (US)

( * ) Notice: Subject to any disclaimer, the term of this patent is extended or adjusted under 35 U.S.C. 154(b) by 231 days.

(21) Appl. No.: 13/527,048

(22) Filed: Jun. 19, 2012

(65) Prior Publication Data

US 2013/0339803 A1 Dec. 19, 2013

(51) Int. Cl.
*G06F 13/24* (2006.01)

(52) U.S. Cl.
CPC ...................................... *G06F 13/24* (2013.01)
USPC ........... 710/260; 710/262; 710/264; 710/266; 710/269

(58) Field of Classification Search
CPC ....................................................... G06F 13/24
USPC ........................... 710/260, 262, 264, 266, 269
See application file for complete search history.

(56) References Cited

U.S. PATENT DOCUMENTS

| | | | | |
|---|---|---|---|---|
| 5,619,705 | A * | 4/1997 | Karnik et al. ................ | 710/266 |
| 5,956,516 | A * | 9/1999 | Pawlowski .................... | 710/260 |
| 6,195,725 | B1 * | 2/2001 | Luhmann ...................... | 710/266 |
| 7,051,137 | B2 * | 5/2006 | Poisner ......................... | 710/260 |
| 7,398,343 | B1 * | 7/2008 | Marmash et al. ............. | 710/269 |
| 7,409,483 | B2 * | 8/2008 | Bennett ......................... | 710/261 |
| 7,689,747 | B2 * | 3/2010 | Vega et al. .................... | 710/261 |
| 7,783,809 | B2 * | 8/2010 | Tiruvallur et al. ............ | 710/268 |
| 7,805,556 | B2 * | 9/2010 | Hagita .......................... | 710/262 |
| 7,953,916 | B2 * | 5/2011 | Pan et al. ...................... | 710/268 |
| 8,166,223 | B2 * | 4/2012 | Bennett ......................... | 710/261 |
| 8,463,972 | B2 * | 6/2013 | Pan et al. ...................... | 710/268 |
| 2001/0032284 | A1 * | 10/2001 | Pawlowski .................... | 710/260 |
| 2001/0032285 | A1 * | 10/2001 | Pawlowski et al. ........... | 710/260 |
| 2001/0032286 | A1 * | 10/2001 | Pawlowski .................... | 710/260 |
| 2004/0088460 | A1 * | 5/2004 | Poisner ......................... | 710/260 |
| 2006/0218328 | A1 * | 9/2006 | Vega et al. .................... | 710/260 |
| 2007/0002760 | A1 * | 1/2007 | Tiruvallur et al. ............ | 370/252 |
| 2008/0276027 | A1 * | 11/2008 | Hagita .......................... | 710/263 |
| 2010/0262737 | A1 * | 10/2010 | Pan et al. ...................... | 710/260 |
| 2011/0231590 | A1 * | 9/2011 | Pan et al. ...................... | 710/266 |
| 2013/0198432 | A1 * | 8/2013 | Ning et al. .................... | 710/306 |

* cited by examiner

*Primary Examiner* — Ryan Stiglic (74) *Attorney, Agent, or Firm* — Fish & Richardson P.C.

(57) ABSTRACT

A process for managing interrupts, which may be performed using electronic circuitry, includes: receiving interrupts bound for a processing device, where the interrupts are received from hardware devices that are configured to communicate with the processing device; generating data containing information corresponding to the interrupts; and sending the data to the processing device.

18 Claims, 4 Drawing Sheets

MANAGING INTERRUPTS

TECHNICAL FIELD

This disclosure relates generally to managing interrupts that are directed to a processing system.

BACKGROUND

Automatic test equipment (ATE) plays a role in the manufacture of electronics, such as semiconductor devices and circuit board assemblies. Manufacturers generally use automatic test equipment, or "test instruments", to verify the operation of devices during the manufacturing process. Such devices are referred to as a "device under test" (DUT) or a "unit under test" (UUT).

ATEs typically include a processing device, such as a microprocessor, and hardware elements, such as circuitry or logic configured to perform various tasks. The hardware elements may issue interrupts to the processing device. Generally speaking, an interrupt is an asynchronous signal indicating that a particular hardware device is in need of attention. In some examples, a hardware interrupt causes the processing device to save its state of execution and to begin execution of an interrupt handler. The interrupt hander may include code that is executed on the processor to service the interrupt.

In ATEs and other computing systems that include numerous hardware elements, individual processing of interrupts can sometimes be problematic. For example, in a peripheral component interconnect (PCI) Express-based system (PCIe), message signal interrupts (MSI) are sent from individual hardware elements to a processing device (referred to as a "root complex" in PCI Express parlance). Each time the processing device receives an MSI, it may address the interrupt, which can interfere with processing and thereby affect processing efficiency.

SUMMARY

Described herein are example processes for managing interrupts. The example processes may be performed using electronic circuitry. An example process may include: receiving interrupts bound for a processing device, where the interrupts are received from hardware devices that are configured to communicate with the processing device; generating data containing information corresponding to the interrupts; and sending the data to the processing device. The example process may include one or more of the following features, either alone or in combination.

The data may first data, and the processes may include the following: generating second data, where the second data identifies the electronic circuitry; and sending the second data to the processing device following the first data. The electronic circuitry may comprise a first aggregator, and the second data may comprise a signature unique to the first aggregator.

At least some interrupts may be received via a dedicated transmission path, and at least some (e.g., other) of interrupts may be multiplexed on a same transmission path. The data may comprise a packet containing an address that corresponds to the processing device.

Also described herein is example electronic circuitry for managing interrupts. An example of the electronic circuitry may include the following: an input interface for receiving interrupts bound for a processing device, where the interrupts are received from hardware devices that are configured to communicate with the processing device; a data generator for generating data containing information corresponding to the interrupts; and an output interface for sending the data to the processing device. The example electronic circuitry may include one or more of the following features, either alone or in combination.

The data may be first data; the data generator may be configured to generate second data, where the second data identifies the electronic circuitry; and the second data may be sent over the output interface to the processing device following the first data. The electronic circuitry may comprise a first aggregator; and the second data may comprise a signature unique to the first aggregator. Each first interrupt may be received via a dedicated transmission path between corresponding hardware and the electronic circuitry, and at least some of the second interrupts may be multiplexed on a same transmission path. The data may comprise a packet containing an address that corresponds to the processing device.

Also described herein are example systems for managing interrupts. An example of a system may include the following: a processing device; one or more first dedicated lines for transmitting first interrupts having a first latency; one or more second dedicated lines for transmitting second interrupts having a second latency that is different from the first latency, where interrupts on the second lines are multiplexed for transmission; and circuitry to receive the first interrupts and the second interrupts, to generate data corresponding to the first interrupts and the second interrupts, and to send the data to the processing device. The example system may include one or more of the following features, either alone or in combination.

The data may be first data and the circuitry may be configured to send second data to the processing device. The second data may be sent after the first data, and the second data may identify the circuitry. The circuitry may comprise a first aggregator; and the second data may comprise a signature unique to the first aggregator. The data may comprise a packet containing an address that corresponds to the processing device.

The system may comprise a PCI Express bus to interconnect the circuitry and the processing device. The data may be sent over the PCI Express bus. The system may comprise a second processing device, and the circuitry may send the data to the second processing device. The first and second processing devices may be root complexes. The data may be first data and the circuitry may be configured to send second data to the second processing device. The second data may be sent after the first data, and the second data may identify the circuitry.

Two or more of the features described in this disclosure, including this summary section, may be combined to form embodiments not specifically described herein.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DETAILED DESCRIPTION

Described herein is a test instrument that manages interrupts on buses, such as a PCI Express bus domain. The test instrument is configured, among other things, to receive interrupts bound for a processing device internal or external to the bus domain, to generate data containing information corresponding to the interrupts, and to send the data to the processing device. The data may take the form of one or more packets, that aggregate the interrupts, and that are addressed to the processing device (e.g., a PCI Express root complex). Following receipt, the processing device may read the payload of the initial packet, and service the interrupts identified therein.

Figure 1:
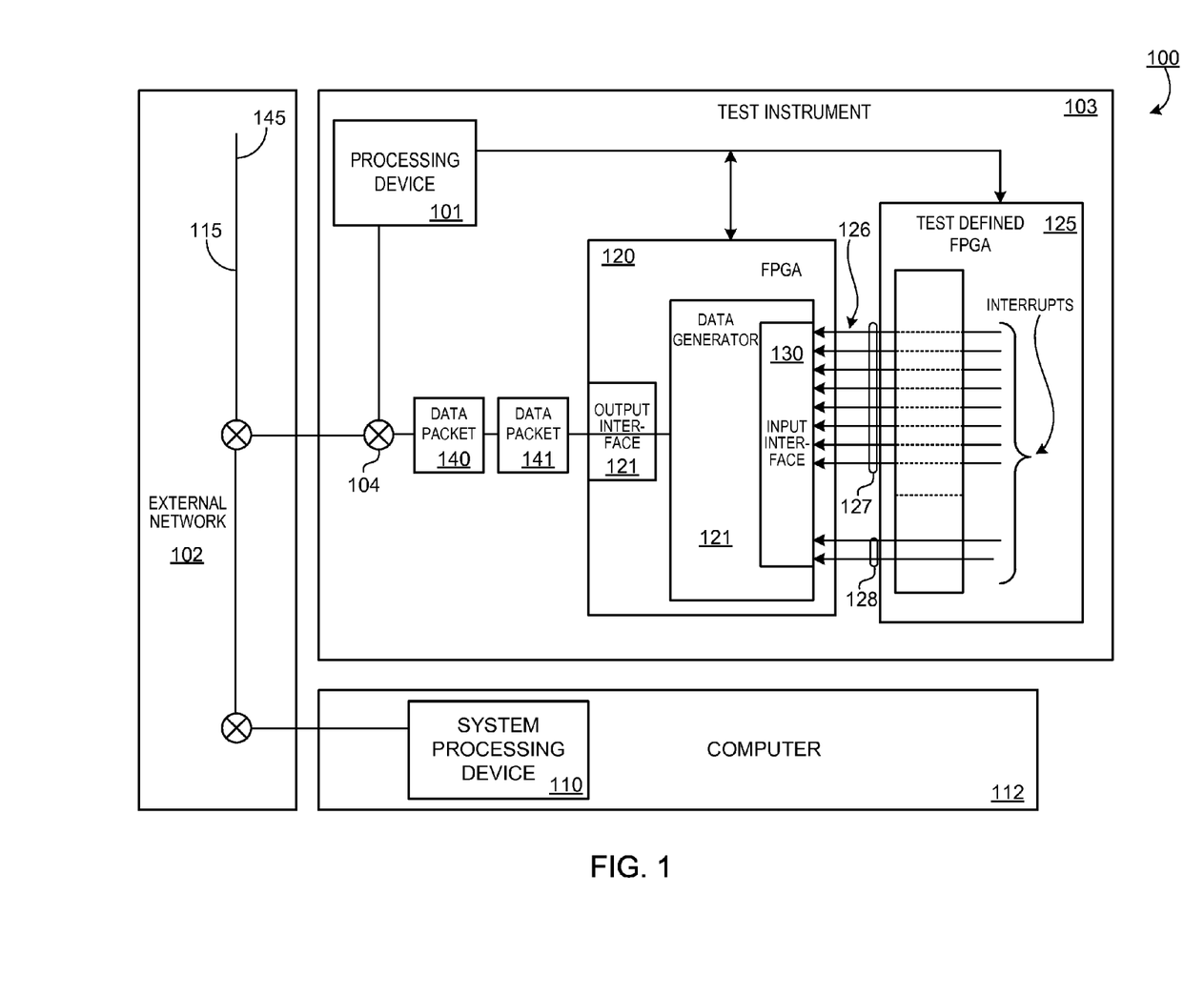
FIG. 1 is an example block diagram of a test instrument.

FIG. 1 is a block diagram of an example implementation of the foregoing test instrument 100, also referred to as ATE. In FIG. 1, test instrument 100 includes a processing device 101, which may be a central processing unit (CPU). Processing device 101 may be a microprocessor, microcontroller, programmable logic, or other appropriate circuitry for performing processing operations.

In this example, processing device 101 controls various features of test instrument 100, such as communication with an external network 102, which may be a PCI Express network. In addition, processing device 101 is programmable to perform various testing operations, examples of which are provided below. In some examples, processing device 101 may include one or more processing devices, such as one or more microprocessors or a single multi-core microprocessor (not shown). Processing device 101 may also include memory (not shown) that stores executable code to control test instrument communication with the external environment, and to perform various "housekeeping" functions to control operation of test instrument 100. For example, processing device 101 may be responsible for exchanging communications between the test instrument and one or more external entities over an output interface such as a network interface, memory management, power control, and other functions that are not specifically related to testing.

Processing device 101 is programmable to perform test operations on a UUT (not shown) interfaced to test instrument 100, e.g., via network 102. The test operations may include, but are not limited to, testing bus speed, reaction time, or any other appropriate operational aspects of the UUT. In general, the testing that is performed is dependent upon the type of device being tested, and the information sought during testing. In this regard, one or more test programs may be loaded into memory on processing device 101, and executed by processing device 101 in order to perform the testing. While performing testing, processing device 101 may continue to perform other functions, including those described elsewhere herein, e.g., to keep test instrument 100 operational.

In some implementations, processing device 101 may be part of a multi-tiered processing system. For example, the first tier may include a system processing device 110. System processing device 110 may be a microprocessor, microcontroller, programmable logic, or other appropriate circuitry for performing processing operations. System processing device 110 may be configured to perform testing operations, such as those described herein, on individual UUTs. System processing device 110 may also be configured to coordinate processing among various test instruments, including test instrument 100. System processing device 110 may be separate (e.g., remote) from, or incorporated into, a test instrument. In FIG. 1, system processing device 110 is part of computer 112, although that need not be the case in other system implementations.

A second tier in the multi-tiered system may include embedded processing devices, such as processing device 101. Such processing devices are embedded in the sense that they are incorporated into cores of test instrument 100, and may be dedicated to performing test functions (e.g., to testing UUTs interfaced to test instrument 100). In this regard, FIG. 1 shows only one core 103 of the test instrument; however multiple cores identical to core 103 may be included in the same test instrument. Embedded processing devices need not (but may) be responsible for test instrument operations. In some implementations, the embedded processing devices may be programmed to perform one or more such operations, or other operations not specifically directed to testing UUTs. A third tier may include programmable logic, e.g., field-programmable gate arrays (FPGAs) (not shown), each of which may be configured to act as an interface between a UUT, or portion thereof (e.g., a UUT bus) and test instrument 100, and to facilitate testing.

In some implementations, testing may be performed exclusively by one tier or another of the architecture. For example, processing device 101 may be programmed to run one or more test programs to test a UUT, while devices on other tiers of the architecture do not perform UUT tests. System processing device 110 may be programmed to run one or more test programs to test a UUT, while devices on other tiers of the architecture do not perform UUT tests. Devices that are not performing tests are not necessarily dormant during this time. For example, system processing device 110 may continue to coordinate operations among various cores of the test instrument and/or other test instrument electronics; the FPGAs may continue to route data to/from the UUT (i.e., to act as interfaces to the UUT); and the embedded processing devices may continue to be active in coordination or other communication (e.g., transmitting test results from the FPGAs to system processing device 110). In other implementations, testing may be performed by different tiers of the architecture concurrently or in concert (e.g., coordinated among the tiers).

For example, two or more of system processing device 110, embedded processing devices 101, and FPGA(s) (not shown) may act in coordination at the same time or within the same test sequence to perform one or more test operations on a single UUT or on multiple UUTs. To effect such coordination, appropriate programming is loaded into processing devices 101 and/or 110, and/or appropriate images are loaded into the FPGA(s). By way of example, a first test may be performed on a UUT by system processing device 110; and a second test may be performed on the UUT by processing device 101. The first and second tests may be separate tests, or part of the same test sequence. Data from the various tests may be combined, e.g., in system processing device 110, and processed to obtain the appropriate test results. These test results may be sent to an external computer for analysis and reporting.

In FIG. 1, network 102 may have a PCI Express bus backbone 115. Generally, a PCI Express bus is a high-speed serial interconnect bus that uses shared address/data lines. PCI Express is based on point-to-point topology, with separate serial links connecting devices to a root complex (e.g., processing device 101 for core 103). PCI Express communication is encapsulated in packets. As noted above, conventionally, in the PCI Express protocol, message signal interrupts (MSI) are sent from individual hardware elements to the root complex (e.g., processing device 101 in core 103).

In the example system described herein, electronic circuitry may be configured to receive interrupts from multiple various hardware devices on test instrument 100. Test instrument 100 includes electronic circuitry, e.g., programmable logic such as FPGA 120, that acts as an aggregator to aggregate (e.g., combine) and output information about interrupts. FPGA 120 is configured, among other things, to receive interrupts bound for a root complex (e.g., processing device 101). In this example, the interrupts are received from one or more hardware devices that are configured to communicate with the processing device. FPGA 120 is also configured to generate data (e.g., packet(s)) containing information corresponding to the interrupts, and to send the data to the processing device. In some implementations, FPGA 120 is programmed to implement a data generator 121 to perform the operations of generating data containing information corresponding to the interrupts, and sending the data to the processing device.

In this example, FPGA 120 is positioned in a circuit path between test hardware (e.g., test defined FPGA 125) and processing device 101. Although the hardware element shown in FIG. 1 is an FPGA, any other appropriate hardware element or elements may be used. For example, the hardware elements may include microcontrollers, logic gates, memory, and so forth, which may be used alone or in concert in performing UUT test or other operations.

In this example implementation, dedicated transmission lines 126 are used to transmit interrupts between various hardware devices (represented by FGPA 125 in this example) and FPGA 120. FPGA 120 may include an input interface 130 that is configured to receive interrupts from the dedicated transmission lines. The dedicated transmission lines may be simple conduits, such as wires, or more complex conduits, such as buses. Dedicated transmission lines 126 include transmission lines 127, which are used to transmit interrupts. In this example, each transmission line is reserved for use by a particular hardware element; however, that need not be the case. In this example, there are eight transmission lines; however, any appropriate number may be included in tester 100. In this example, there are two low latency transmission lines 128; however, any appropriate number may be included in tester 100. The low latency transmission lines are used to transmit low latency interrupts. In this example, each low latency transmission line may service multiple hardware elements. For example, interrupts from multiple hardware elements may be multiplexed (via, e.g., a multiplexer—not shown) onto a low latency transmission line. In other implementations, this need not be the case, e.g., there may also be dedicated transmission lines for low latency interrupts.

The interrupts may be ordered. For example, the FPGA can aggregate the interrupts into a packet and order the interrupts for execution. Although the FPGA may order the interrupts, it is up to the processing device that actually handles the interrupts to determine whether that order is to be followed or if the interrupts are to be handled in a different order dictated by that processing device.

FPGA 120 receives interrupts over dedicated transmission lines 126. FPGA 120 generates one or more data packets that represent the interrupts. In this example, a single data packet is used to represent interrupts received within a particular time frame. However, in other examples, multiple data packets may be used to transmit the same interrupts. The data packet may include a header and a payload. The header may indicate that the packet includes interrupts, and may also specify the destination of the data packet (e.g., the address of processing device 101 or other root complex). The payload may include one or more bits indicating that an interrupt has been received and one or more bits identifying (e.g., by address or other designation) the identity of the hardware element that issued the interrupt. Other data may also be included in the data packet.

FPGA 120 may include an output interface 131, through which data packets are sent, via a PCI Express bus (in this example), to processing device 101. Processing device 101 receives such a data packet 140 and stores it in memory, at least until receipt of a second data packet from FPGA 120. More specifically, processing device 101 executes code (e.g., instructions) that reads the data packet, identifies the interrupts contained therein (and the sources thereof), and services the interrupts. This code may be part of an interrupt handler. In this example, however, the code is not executed upon receipt of data packet 140. Rather, processing device 101 includes memory (e.g., a register), the writing to which triggers execution of the code and interpretation of data packet 140.

In this example, after sending data packet 140, FPGA 120 generates and sends, over its output interface, second data (e.g., a second data packet 141) to processing device 101. This second data packet 141 is addressed to the register on processing device that will trigger execution of the interrupt handler. This second data packet may include a header that includes the packet's destination address. The second data packet may also include a payload. The payload may identify the source of the data, e.g., FPGA 120. For example, the payload may identify the FPGA by device or network address or other type of signature that is unique to the sending FPGA. This feature enables interrupts to be directed to locations on a PCI network other than a root complex. For example, a non-transparent bridge 145 may connect a core 103 of test instrument to other cores (not shown). In an example, the non-transparent bridge is a pathway that interconnects two different PCI Express domains. By appropriately addressing data packets, FPGA 120 may cause a processing device in another core (e.g., a device other than processing device 101 in the same core) to service one or more interrupts in cores (root complexes) that are external to the processing device. For example, the payload may also identify the sources of interrupts on a bus domain that is external to the processing device. This is different from the simple PCI Express model, which limits servicing of interrupts to the root complex of a PCI network.

Here, FPGA 120 writes second data packet 141 to an appropriate register address in processing device 101. This action causes processing device 101 to execute code (e.g., to run the interrupt handler) to read, interpret, and act upon the first data packet and thereby to service one or more interrupts identified in the first data packet in an appropriate order.

Figure 2:
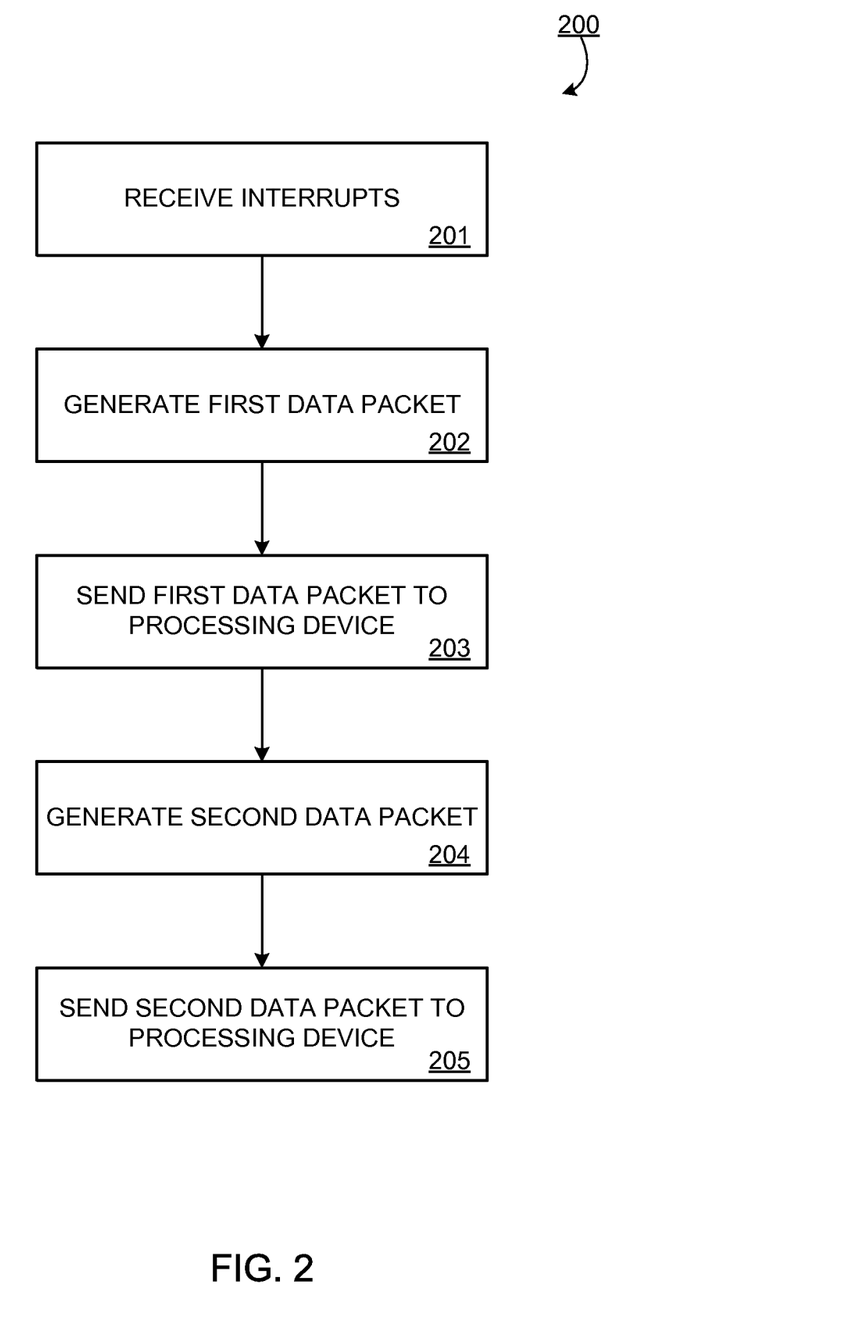
FIG. 2 is a flowchart of an example process that may be performed by the test instrument of FIG. 1.

FIG. 2 is a flowchart showing a process 200 performed by the system of FIG. 1. According to FIG. 2, the process includes FPGA 120 receiving (201) interrupts bound for processing device 101. The interrupts are received from hardware devices that are configured to communicate with processing device 101. In the example of FIG. 1, the interrupts are received from FPGA 125. FPGA 120 generates (202) data containing information corresponding to the interrupts, and sends (203) that data (e.g., a first data packet) to processing device 101. Processing device 101 stores this data packet in memory until a second data packet is received. Receipt of this second packet (e.g., an MSI packet) triggers the interrupt handler of processing device 101 to service interrupts identified in this first data packet. Accordingly, FPGA 120 generates (204) second data (e.g., a second data packet). This second data packet identifies the hardware (e.g., electronic circuitry, processor, etc.) that sent the interrupts. This second data packet is sent (205) to the processing device, and written to an appropriate register on the processing device that triggers the processing device's interrupt handler. Once triggered, the interrupt handler service interrupts identified in the first data packet.

In a specific implementation, FPGA 120 ("the FPGA") implements Packet Transported Interrupt Requests (PTIQs) of the type described above with respect to FIGS. 1 and 2. The FPGA (referred to in the following as the "X3") implements PTIQ interrupts for a Test Defined FPGA (TDF), such as FGPA 125, via an interface called the PTIQ bus. Up to 256 interrupt sources are supported on the PTIQ bus. An example of the PTIQ bus includes transmission lines 126 FIG. 1.

In operation, prior to sending an MSI packet, the X3 first writes a PTIQ packet to host memory. An example of a host in this implementation is processing device 101 of FIG. 1. In this implementation, the PTIQ packet's fixed-length 8DW (double word) payload is a bit map identifying which of the 256 possible TDF interrupt sources are currently active. The PTIQ packet is written to a PCIe destination address currently specified in the X3's "PTIQ_PTR" register, which is configured by the host. The MSI packet employs a fixed message data field, and thus resolves only which endpoint is requesting interrupt service.

The X3 contains 256 mask bits that the host may use to mask PTIQ sources. If a source is masked, then the X3 will not include the source in its PTIQ list. All bits are masked by default. The TDF asserts 256 source request signals to X3. The TDF holds each active request asserted until the host takes action directly to the TDF to satisfy the request. For example, the TDF asserts a PTIQ request 0 (PTIQ_0) directly from a "not empty" flag of an internal UART Rx FIFO. When the host reads the FIFO data and the FIFO empties, PTIQ_0 is deasserted.

The host interrupt service routine is as follows. The host examines its PTIQ list and chooses to service or to ignore each active source. In this example, sources #0-#7 have low-latency sources and sources #8-#255 have higher (and variable) latency. Software can order interrupts by algorithmically choosing the order of sources to service. The interrupt service routine (ISR) in the host may ignore certain requests in order to give other interrupts a higher class of service. For example, the ISR may always handle source #0-#4 but service #5-#256 in round robin order. In this implementation, the X3 waits until the host rewrites the PTIQ_PTR before sending another PTIQ packet/MSI. Although rewriting the same address is acceptable, the host may employ a circular set of buffers to form a debugging trail or for other reasons. If the host wishes to update the X3's mask bits, it does so before rewriting the PTIQ_PTR. Once the PTIQ_PTR is updated, the X3 forms a new PTIQ packet containing all the unmasked still-active and unmasked newly active requests. The TDF holds requests active until directly serviced by the host. The X3 does not latch requests.

In this implementation, the X3 contains host-programmable registers that, if initialized, produce additional small write packets that precede the PTIQ packet and the MSI packet. These packets re-program the PCIe translation windows for the PTIQ and MSI packets that follow. In other implementations, software will not initialize the registers, and the extra packets will not be sent.

In this example implementation, the PTIQ bus (the bus between the TDF and the X3) contains ten wires, including outputs from the TDF and inputs to the X3. Eight wires correspond to PTIQ_0 thru PTIQ_7. These are asynchronous and low-latency. PTIQ_8 and above (up to PTIQ_255) are optional. These are time-multiplexed onto a single wire that is synchronized to a 100 Mhz system clock. The final wire is an always-repeating start-of-frame pulse coincident with PTIQ_8. The frame length depends on how many serial PTIQ's are used, and the X3 does not need to be told the frame length beforehand. The frame and serial data repeat since all PTIQ's remain asserted until the source logic is serviced by the host.

For the serial PTIQ's, the X3 has a WAIT_FOR_FRAME mode bit. If this WAIT_FOR_FRAME mode bit is set, the X3 will wait for the end of a serial frame before transmitting a PTIQ packet. This mode adds latency, but allows logic in the TDF to group-together interrupt sources for efficiency, if desired.

The PTIQ does not preclude the TDF from implementing a standard 4-register IRQ logic. That logic's output line may drive any of the PTIQ_0 thru PTIQ_7 wires. The standard IRQ logic is expandable by cascading IRQ logic blocks.

Figure 3:
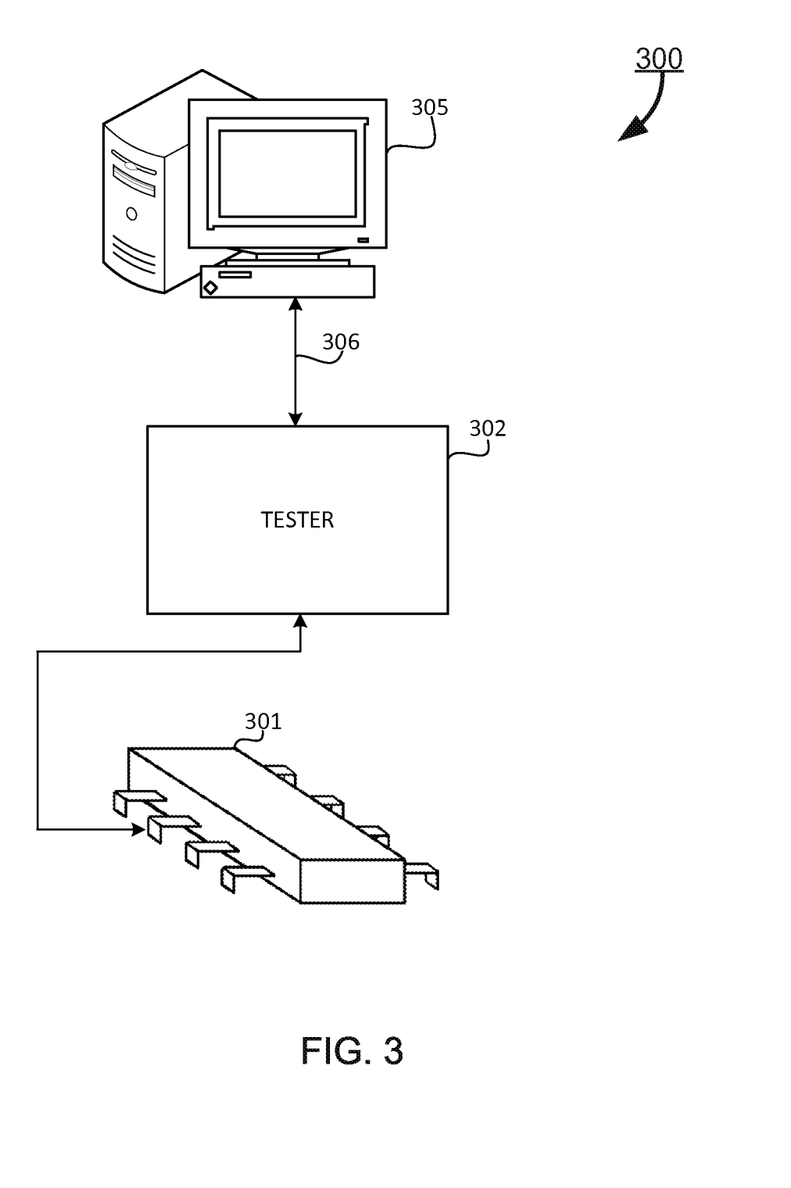
FIG. 3 is a block diagram of an example test system that may include the test instrument of FIG. 1, or portions thereof.

Referring now to FIG. 3, that figure shows an example of a system on which the foregoing architecture may be implemented. FIG. 3 shows an example test system 300 for testing a UUT 301. The test system of FIG. 3 may include test instrument 100 or portion(s) thereof. Test system 300 includes a tester 302, which may have the multi-tiered architecture of FIG. 1 or 2. To interact with tester 302, system 300 includes a computer system 305 that interfaces with tester 302 over a network connection 306. As noted below, computer system 305 may incorporate the functionality of computer 112 (FIG. 1) or it may be an external computer that interacts with computer 112 on the test instrument. Typically, computer system 305 sends commands to tester 302 to initiate execution of routines and programs for testing UUT 301. Such executing test programs may initiate the generation and transmission of test signals to the UUT 301 and collect responses from the UUT. Various types of UUTs may be tested by system 300. For example, UUTs may be avionics, radar, weaponry, semiconductor devices, and so forth.

To provide test signals and collect responses from the UUT, tester 302 is connected, via an appropriate FPGA interface, to one or more connector pins that provide an interface for the internal circuitry of UUT 301. For illustrative purposes, in this example, device tester 302 is connected to a connector pin of UUT 301 via a hardwire connection to deliver test signals (to the internal circuitry of UUT 301). Tester 302 also senses signals at UUT 301 in response to the test signals provided by device tester 302. For example, a voltage signal or a current signal may be sensed at a UUT pin in response to a test signal. Such single port tests may also be performed on other pins included in UUT 301. For example, tester 302 may provide test signals to other pins and collect associated signals reflected back over conductors (that deliver the provided signals). In some examples, by collecting the reflected signals, the input impedance of the pins may be characterized along with other single port testing quantities. In other test scenarios, a digital signal may be sent to UUT 301 for storage on UUT 301. Once stored, UUT 301 may be accessed to retrieve and send the stored digital value to tester 302. The retrieved digital value may then be identified to determine if the proper value was stored on UUT 301.

Along with performing one-port measurements, a two-port test may also be performed by device tester 302. For example, a test signal may be injected to a pin on UUT 301 and a response signal may be collected from one or more other pins of UUT 301. This response signal is provided to device tester 302 to determine quantities, such as gain response, phase response, and other throughput measurement quantities.

Figure 4:
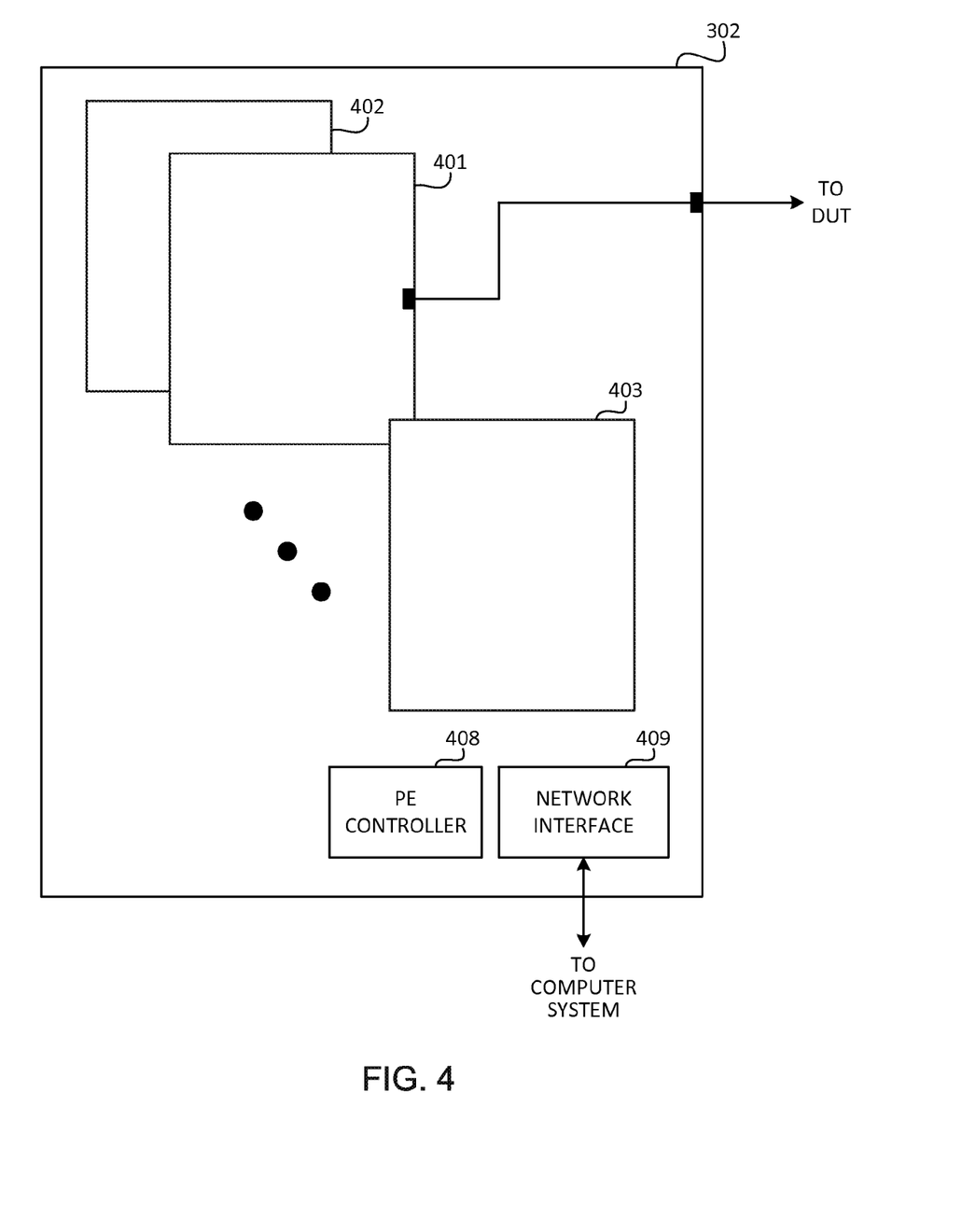
FIG. 4 is a block diagram of a portion of the test system of FIG. 3.

Referring also to FIG. 4, to send and collect test signals from multiple connector pins of a UUT (or multiple UUTs), device tester 302 includes an interface card 401 that can communicate with numerous pins. For example, interface card 401 includes the one or more cores (e.g., root complexes) described herein, which may be used to transmit test signals to the UUT and to collect corresponding responses. Each communication link to a pin on the UUT may constitute a channel and, by providing test signals to a large number of channels, testing time may be reduced since multiple tests may be performed simultaneously. Along with having many channels on an interface card, by including multiple interface cards in tester 302, the overall number of channels increases, thereby further reducing testing time. In this example, two additional interface cards 402 and 403 are shown to demonstrate that multiple interface cards may populate tester 302.

Each interface card may include dedicated integrated circuit circuitry, including, e.g., an FGPA and embedded processing device (as described, e.g., FIG. 1), for performing particular test functions. This circuitry may implement, e.g. a pin electronics (PE) stage for performing PE tests, and a parametric measurement unit (PMU) stage for performing tests. Typically PMU testing involves providing a (programmable) DC voltage or current signal to the UUT to determine such quantities as input and output impedance, current leakage, and other types of DC performance characterizations. PE testing involves sending DC or AC test signals, or waveforms, to a UUT (e.g., UUT 301) and collecting responses to further characterize the performance of the UUT. For example, the PE stage may transmit (to the UUT) AC test signals that represent a vector of binary values for storage on the UUT. Once these binary values have been stored, the UUT may be accessed by tester 302 to determine if the correct binary values have been stored.

In some arrangements, an interface device may be used to connect one or more conductors from tester 302 to the UUT. For example, the UUT may connect to an Interface Test Adapter (ITA) which interfaces with an Interface Connection Adapter (ICA) that connects with the tester. The UUT (e.g., UUT 301) may be mounted onto a device interface board (DIB) for providing access to each UUT pin. In such an arrangement, a UUT conductor may be connected to the DIB for placing test signals on the appropriate pin(s) of the UUT. Additionally, in some arrangements, tester 302 may connect to two or more DIBs for interfacing the channels provided by interface cards 401 to 403 to one or multiple UUTs.

To initiate and control the testing performed by interface cards 401 to 403, tester 302 includes a PE controller 408 (e.g., in a system processing device, in an embedded processing device, or in programmable logic) to provide test parameters (e.g., test signal voltage level, test signal current level, digital values, etc.) for producing test signals and analyzing UUT responses. Tester 302 also includes a network interface 409 that allows computer system 305 to control the operations executed by tester 302 and also allows data (e.g., test parameters, UUT responses, etc.) to pass between tester 302 and to computer system 305.

The computer system, or another processing device used on or associated with test system 300, may be configured to exchange communications with a test program running on tester 302 through active communication channels with the device tester. The computer system may be, or include, computer 102 of FIG. 1. Alternatively, computer 102 may be part of tester 302 and the computer system described with respect to FIG. 4 may communicate with computer 102.

Testing, including those described herein, may be performed using a system processing device, embedded processing devices, or programmable logic. However, testing may be performed using a combination of system processing device, embedded processing devices, or programmable logic. For example, each of these different elements may run on or more test programs simultaneously to test the same device or portion thereof. Likewise, these different elements may coordinate testing so that, e.g., a system processing device performs a first part of a test sequence, an embedded processing device performs a second part of the same testing sequence, and programmable logic performs a third part of the same testing sequence. Any appropriate coordination may take place between the different programmable elements of the test instrument described herein.

In some implementations, a system processing device may be external to the test instrument. For example, an external computer may be employed to control operations of the test instrument, and may interact with embedded processing device(s) and programmable logic on the test instrument in the manner described herein. In other implementations, the system processing device may be part of the test instrument or remote from the test instrument (e.g., connected to the test instrument over a network).

In some implementations, programmable logic may be replaced with non-programmable logic. For example, rather than using an FPGA, one or more application-specific integrated circuits (ASICs) may be incorporated into the test instrument in place of, or in addition to, programmable logic.

The functionality described herein, or portions thereof, and its various modifications (hereinafter "the functions"), are not limited to the hardware described herein. All or part of the functions can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Components of different embodiments described herein may be combined to form other embodiments not specifically set forth above. Components may be left out of the circuitry shown in FIGS. 1 to 4 without adversely affecting its operation. Furthermore, various separate components may be combined into one or more individual components to perform the functions described herein.

Other embodiments not specifically described herein are also within the scope of the following claims.

What is claimed is:

1. A method performed by electronic circuitry, comprising:
    receiving interrupts bound for a processing device, the interrupts being received from different hardware devices that are configured to communicate with the processing device;
    generating data containing information corresponding to the interrupts, wherein generating comprises aggregating the interrupts in a single data packet; and
    sending the data packet to the processing device.

2. The method of claim 1, wherein the data packet is a first data packet; and
    wherein the method further comprises:
        generating a second data packet, the second data packet identifying the electronic circuitry; and
        sending the second data packet to the processing device following the first data packet.

3. The method of claim 2, wherein the electronic circuitry comprises a first aggregator; and
    wherein the second data packet comprises a signature unique to the first aggregator.

4. The method of claim 1, wherein at least some interrupts are received via a dedicated transmission path, and wherein at least some interrupts are multiplexed on a same transmission path.

5. The method of claim 1, wherein the data packet contains an address that corresponds to the processing device.

6. Electronic circuitry comprising:
    an input interface for receiving interrupts bound for a processing device, the interrupts being received from different hardware devices that are configured to communicate with the processing device;
    a data generator for generating data containing information corresponding to the interrupts, wherein generating comprises aggregating the interrupts in a single data packet; and
    an output interface for sending the data packet to the processing device.

7. The electronic circuitry of claim 6, wherein the data packet is a first data packet;
    wherein the data generator is configured to generate a second data packet, the second data packet identifying the electronic circuitry; and
    wherein the second data packet is sent over the output interface to the processing device following the first data packet.

8. The electronic circuitry of claim 7, wherein the electronic circuitry comprises a first aggregator; and
    wherein the second data packet comprises a signature unique to the first aggregator.

9. The electronic circuitry of claim 8, wherein at least some interrupts are received via a dedicated transmission path between corresponding hardware and the electronic circuitry, and wherein at least some interrupts are multiplexed on a same transmission path.

10. The electronic circuitry of claim 6, wherein the data packet contains an address that corresponds to the processing device.

11. A system comprising:
    a processing device;
    one or more first dedicated lines for transmitting first interrupts having a first latency;
    one or more second dedicated lines for transmitting second interrupts having a second latency that is different from the first latency, interrupts on the second lines being multiplexed for transmission; and
    circuitry to receive the first interrupts and the second interrupts, to generate a data packet corresponding to the first interrupts and the second interrupts, and to send the data packet to the processing device, wherein generating comprises aggregating the first and second interrupts in the data packet, the data packet being a single data packet.

12. The system of claim 11, wherein the data packet is a first data packet and the circuitry is configured to a send second data packet to the processing device, the second data packet being sent after the first data packet, the second data packet identifying the circuitry.

13. The system of claim 12, wherein the circuitry comprises a first aggregator; and
    wherein the second data packet comprises a signature unique to the first aggregator.

14. The system of claim 11, wherein the data packet contains an address that corresponds to the processing device.

15. The system of claim 11, further comprising a PCI Express bus to interconnect the circuitry and the processing device, the data packet being sent over the PCI Express bus.

16. The system of claim 15, wherein the system further comprises a second processing device, wherein the circuitry is configured to send the data packet to the second processing device.

17. The system of claim 16, wherein the first and second processing devices are root complexes.

18. The system of claim 16, wherein the data packet is a first data packet and the circuitry is configured to a send second data packet to the second processing device, the second data packet being sent after the first data packet, the second data packet identifying the circuitry.

* * * * *